United States Patent
Khullar et al.

(10) Patent No.: US 6,904,104 B1
(45) Date of Patent: Jun. 7, 2005

(54) TECHNIQUE FOR DEMODULATING A LINEAR MODULATED DATA SIGNAL IN A COMMUNICATIONS SYSTEM

(75) Inventors: Anders Khullar, Bjärred (SE); Björn Lindquist, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/393,657

(22) Filed: Sep. 10, 1999

(51) Int. Cl.[7] ............................ H03D 3/22; H04L 27/22
(52) U.S. Cl. ....................... 375/332; 375/329; 375/334; 375/335
(58) Field of Search ................................. 375/332, 329, 375/334, 335, 336, 322, 261, 272, 274, 273, 279, 280

(56) References Cited

U.S. PATENT DOCUMENTS

| | | | |
|---|---|---|---|
| 5,499,273 A | 3/1996 | Kull et al. | 375/355 |
| 5,640,670 A * | 6/1997 | Samueli et al. | 455/3.2 |
| 6,243,430 B1 * | 6/2001 | Mathe | 375/346 |
| 6,473,506 B1 * | 10/2002 | Hook et al. | 379/279 |

FOREIGN PATENT DOCUMENTS

| EP | 0 757 458 A2 | 2/1997 |
|---|---|---|
| EP | 0 809 376 A2 | 11/1997 |
| GB | 2 276 797 A | 10/1994 |

OTHER PUBLICATIONS

EPO Standard Search Report No. RS 104452 dated May 22, 2000.

* cited by examiner

Primary Examiner—Mohammad H. Ghayour
(74) Attorney, Agent, or Firm—Jenkens & Gilchrist, P.C.

(57) ABSTRACT

A receiver section recovers the in-phase and quadrature components of a linear modulated data signal. The in-phase signal is sampled and quantized producing an in-phase sample stream, and the quadrature phase signal is sampled and quantized producing a quadrature sample stream. The in-phase sample stream and the quadrature sample stream are both over-sampled at a rate of N times a symbol rate of the data signal. A decimation section filters the quantized in-phase sample stream and the quantized quadrature sample stream to produce a reduced in-phase sample stream and a reduced quadrature sample stream at a rate of M times the symbol rate, wherein M is less than or equal to N. A decision component calculates the magnitude of a combination of an in-phase sample and a quadrature sample at M corresponding sample points in the reduced in-phase sample stream and the reduced quadrature sample stream, respectively, and then forms an in-phase symbol stream and a quadrature symbol stream using the in-phase sample and the quadrature sample, respectively, associated with the sample point having a largest magnitude.

17 Claims, 3 Drawing Sheets

TECHNIQUE FOR DEMODULATING A LINEAR MODULATED DATA SIGNAL IN A COMMUNICATIONS SYSTEM

FIELD OF THE INVENTION

The present invention relates generally to digital mobile communications and, more particularly, to a technique for demodulating a linear modulated data signal in a communications system.

BACKGROUND OF THE INVENTION

The Global System for Mobile Communications (GSM) is the mobile communications standard that is used throughout Europe. FIG. 1 illustrates a GSM system 1 comprising a mobile unit 2 and a GSM base station 3. The mobile unit 2 has a transmitting part and a receiving part. The transmitting part of the mobile unit 2 comprises a microphone 10, an analog-to-digital (A/D) converter 11, a segmentation unit 12, a speech coder 13, a channel coder 14, an interleaver 15, a ciphering unit 16, a burst formatting unit 17, and a transmitter modulator 18. The receiving part of the mobile unit 2 comprises a receiver 40 for transmitting sound to the user, a digital-to-analog converter (D/A) 25, a speech decoder 24, a channel decoder 23, a de-interleaver 22, a de-cipherer 21, a Viterbi equalizer 20, and a receiver demodulator 19. An antenna 41 transmits signals both from the transmitter part and to the receiver part of mobile unit 2.

Base station 3 has a transmitting part and receiving part. The receiving part of base station 3 comprises a speech decoder 31, a channel decoder 30, a de-interleaver 29, a deciphering unit 28, a Viterbi equalizer 27, and a receiver demodulator 26. The transmitting part of base station 3 comprises a digital-to-digital (D/D) conversion unit 38 allowing for the input of data, a speech coder 37 for coding a voice signal, a channel coder 36, an interleaver 35, a ciphering unit 34, a burst formatting unit 33, and a transmitter modulator 32. An antenna 39 is used for both transmission by the transmitter part and reception by the receiving part of base station 3. Signals communicate between the mobile unit 2 and the base station 3 through a channel 4 which is typically an air interface.

Operation of the GSM system 1 precedes as follows for the case where the mobile unit 2 transmits and the base station 3 receives. A speaker speaks into microphone 10 producing an analog voice signal. The analog voice signal is applied to the A/D converter 11 resulting in a digitized speech signal. In GSM, 13 bits are used to quantize the signal into 8192 levels and the signal is sampled at an 8 kHz rate. The digitized speech waveform is then fed into the segmenter 12 which divides the speech signal into 20 ms segments. The segments are fed into the speech coder 13 for reduction of the bit rate. The speech coders defined for GSM today reduce the bit rate to 13 kbits/s. The next steps are channel coding and interleaving. The channel coder 14 adds error correcting and error detecting codes to the speech waveform. The interleaver 15 separates the consecutive bits of a message to protect against burst errors. The ciphering unit 16 adds bits to protect from eavesdropping. The burst formatting unit 17 formats bits into GSM burst frames and adds additional formatting bits (adds start and stop bits, flags, etc.) to each GSM burst frame. A typical GSM burst frame designed to fit within a Time Division Multiple Access (TDMA) slot may have, along with several formatting bits, 57 encrypted data bits followed by a 26 bit training sequence for the Viterbi equalizer followed by 57 encrypted data bits. The transmitter modulator 18 applies Gaussian Minimum Shift Keying (GMSK) modulation to the bit stream input producing a modulated radio frequency signal at its output suitable for transmission. The modulated radio frequency signal is transmitted via antenna 41 over channel 4 to antenna 39 of base station 3.

The receiver demodulator 26 receives the modulated radio frequency signal and demodulates the modulated radio frequency signal to a bit stream signal. The Viterbi equalizer 27 creates, based on the 26 bit training sequence, a mathematical model of the transmission channel 4, which in this case is an air interface, and calculates and outputs the most probable transmitted data. In the remaining signal processing chain, the de-ciphering unit 28 performs the inverse transformation performed by the ciphering unit 16, the de-interleaver 29 reverses the interleaving performed by interleaver 15, the channel decoder 30 reverses the channel coding of channel coder 14, and the speech decoder 31 recovers the original digital speech stream. Operation of the GSM system 1 precedes in a similar way in the situation where the base-station unit 3 transmits and the base station 2 receives.

The GMSK modulation scheme adopted for GSM is a digital modulation scheme which may carry data digitized speech. The GMSK modulator can be looked upon as a phase modulator. The carrier changes phase depending on the information bits sent to the modulator. GMSK includes the desirable feature of a constant envelope modulation within a burst. To get smooth curve shapes when changing the phase, the baseband signal is filtered with a Gaussian passband. With GMSK, a narrower bandwidth is obtained compared to ordinary MSK, but the price for this is less resistance against noise.

In a typical GMSK modulator, as known in the prior art, the transmitted data is first transformed into NRZ (Non-return-to-zero format). The NRZ data stream is then integrated and passed through a Gaussian filter. The pre-modulation Gaussian filter has narrow bandwidth and sharp cutoff properties which are required to suppress the high-frequency components of the integrated NRZ data stream. The Gaussian filtered signal is then used to modulate a carrier frequency producing in-phase (I) and quadrature (Q) components of a baseband signal. The I and Q components are then shifted to a carrier frequency $W_0$ by multiplying the I and Q components by corresponding $\cos(nw_0)$ and $-\sin(nw_0)$ carriers and the two resulting flows are added to produce a carrier signal for transmission. A GMSK modulator has the following important characteristics: constant envelope, which-makes GMSK signals rather immune to power amplifier nonlinearities and less susceptible to fading, relatively narrow bandwidth and coherent detection capability.

Although GMSK is a current popular modulation technique, other modulation techniques will be used in future mobile communications systems. In particular, new systems like Enhanced Data Rate for GSM Evolution (EDGE) or Code Division Multiple Access (CDMA) will use linear modulation, such as M-PSK modulation. Linear modulation differs from GMSK modulation in that GMSK modulation has a constant envelope, whereas in linear modulation the amplitude of the modulated signal can vary in amplitude from a high amplitude to a low amplitude. Compared to present standards, like GSM, the modulation depth of a linear system may be quite large. The modulation depth is the difference in the modulated waveform between the lowest amplitude and the highest amplitude. For example, in the EDGE case, using $3\pi/8$ 8-PSK modulation, the modulation depth is about 17 dB.

In demodulation of a GMSK signal, it is possible to sample the GMSK signal at random times because the GMSK modulated waveform has a constant envelope. Thus, when the radio signal is de-modulated and filtered, it is possible to feed the samples at a symbol rate directly into a Viterbi equalizer. This simplifies the receiver considerably and reduces the required number of operations.

This simplified approach becomes more difficult with linear modulation such as, for example, EDGE using $3\pi/8$ 8-PSK. modulation, which typically has a modulation depth and consequently a variation in amplitude. One possible solution is to use over-sampling and digital post-processing of the signal to successfully demodulate a linear modulated waveform having a modulation depth. Although this approach is feasible, it typically requires complex signal processing and large memory.

In view of the foregoing, it would be desirable to provide a technique for demodulating a linear modulated waveform which overcomes the above-described inadequacies and shortcomings. More particularly, it would be desirable to provide a technique for demodulating a linear modulated waveform having a modulation depth in an efficient and cost effective manner.

SUMMARY OF THE INVENTION

In accordance with the present invention, a technique for demodulating a linear modulated data signal having a modulation depth is provided. In order to demodulate the linear modulated data signal, the present invention introduces a decision component in the final down-sampling stage of a demodulator. This decision component is implementable in hardware or software and is fast and has low complexity. Thus, there is an advantage in that a linear modulated data signal may be demodulated in an efficient and cost effective manner using this decision component.

In accordance with a preferred embodiment of the present invention, an apparatus and method are disclosed for demodulating a data signal previously modulated using linear modulation (e.g., $3\pi/8$ 8-PSK). A receiver section receives the linear modulated data signal and produces an in-phase signal and a quadrature phase signal from the linear modulated data signal. A conversion section transforms by quantizing and sampling the in-phase signal into an in-phase sample stream and the quadrature phase signal into a quadrature sample stream, respectively. The in-phase sample stream and the quadrature sample stream are over-sampled at a rate of N times a symbol rate of the data signal. In one exemplary embodiment, N is equal to 48.

A decimation section filters the in-phase sample stream and the quadrature sample stream with one or more filters to produce a reduced in-phase sample stream and a reduced quadrature sample stream at a rate of M times the symbol rate, wherein M is less than or equal to N. In one exemplary embodiment, M is equal to 2.

A decision component calculates the magnitude of a combination of an in-phase sample and a quadrature sample at M corresponding sample points in the reduced in-phase sample stream and the reduced quadrature sample stream, respectively, and then forms an in-phase symbol stream and a quadrature symbol stream using the in-phase sample and the quadrature sample, respectively, associated with the sample point having a largest magnitude.

In accordance with another aspect of the present invention, an in-phase buffer pair receives the reduced in-phase sample stream, wherein each in-phase buffer holds L1 samples of the reduced in-phase sample stream. A first multiplexer coupled to outputs of the in-phase buffer pair selects one of the in-phase buffer pair and outputs in-phase samples forming the in-phase symbol stream. Also, a quadrature buffer pair receives the reduced quadrature sample stream, wherein each quadrature buffer holds L2 samples of the reduced quadrature sample stream. A second multiplexer coupled to outputs of the quadrature buffer pair selects one of the quadrature buffer pair and outputs quadrature samples forming the quadrature symbol stream. The decision component estimates, based on the L1 samples of the in-phase buffer pair, an in-phase sample of the reduced in-phase sample stream to be output by the first multiplexer. The decision component also estimates, based on the L2 samples of the quadrature buffer pair, a quadrature sample of the reduced quadrature sample stream to be output by the second multiplexer. In one exemplary embodiment, L1=10 and L2=10.

The present invention will now be described in more detail with reference to exemplary embodiments thereof as shown in the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
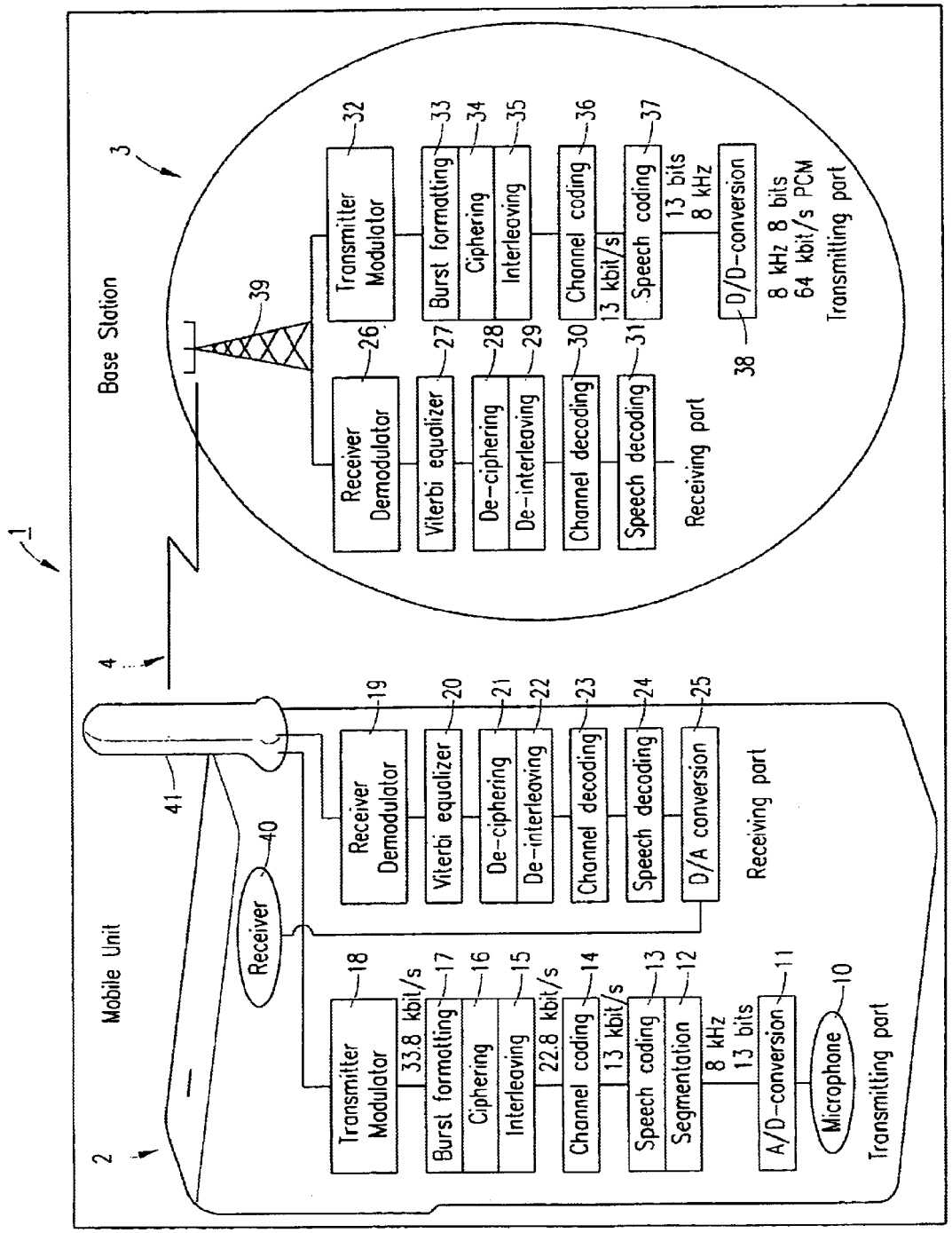
FIG. 1 is a mobile communications network which can incorporate the present invention.
Figure 2:
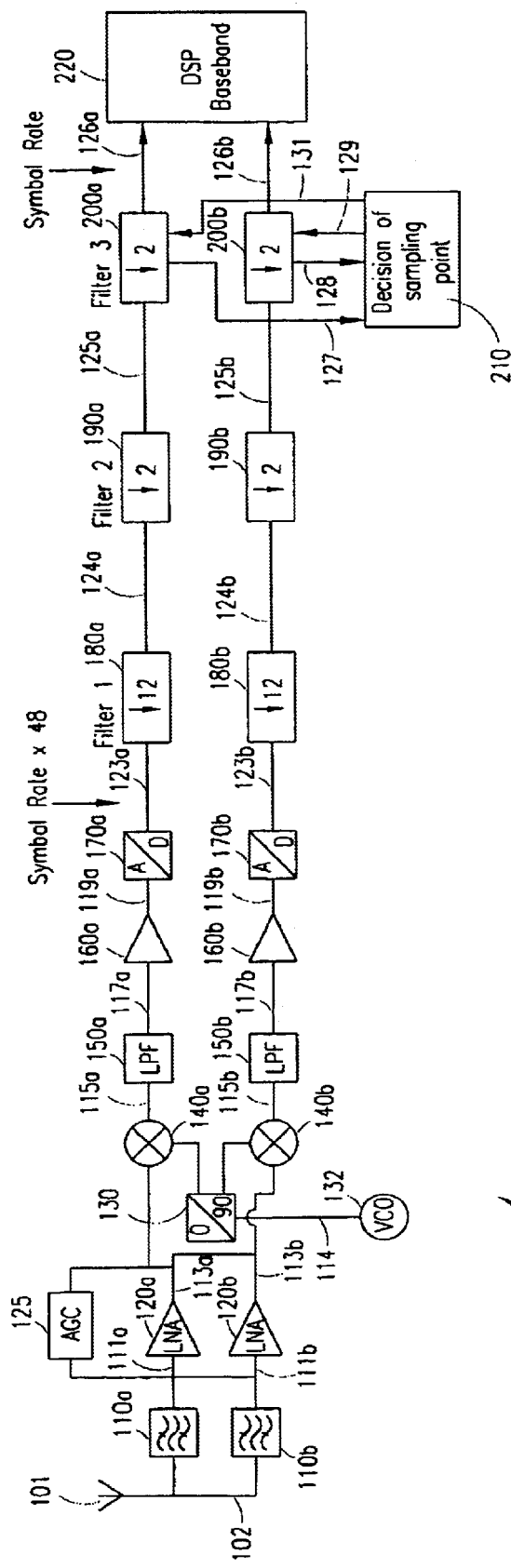
FIG. 2 is a demodulator containing a decision unit according to the present invention.

Referring to FIG. 2, there is shown a linear demodulator 100 according to the present invention. The demodulator 100 may be present alone or, alternatively, in communications equipment constituting a modulator/demodulator pair. For example, referring to FIG. 1, the demodulator 100 may be a receiver demodulator 19 in mobile unit 2 and/or a receiver demodulator 26 in base station 3.

The demodulator 100 receives a modulated radio signal 102 from antenna 101. In the preferred embodiment, the radio signal 102 has been modulated by a digital modulator according to a linear modulation technique such as, for example, $3\pi/8$ 8-PSK modulation. The radio signal 102 is split and sent through bandpass filter 110a and bandpass filter 110b producing two separate signals 111a and 111b. These two signals are fed, respectively, into the in-phase (I) and quadrature phase (Q) parts of the demodulator 100. The signals 111a and 111b are respectively amplified by Low Noise Amplifiers (LNA) 120a and 120b. Only one of the LNA's 120a and 120b is active at any one time. For example, if one LNA is active, the other LNA is typically in a power-down mode. The output signal 113a from LNA 120a and the output signal 113b from LNA 120b are each fed back to an automatic gain control (AGC) circuit 125, which regulates the gain at the inputs to the LNA amplifiers 120a and 120b. A voltage controlled oscillator (VCO) 132 produces carrier frequency $w_0$. Multiplier 140a multiplies the modulated signal 113 output by LNA 120a by a signal at frequency $w_0$ thereby producing a baseband I signal 115a. Multiplier 140b multiplies the modulated signal 113 output by LNA 120b by a phase shifted signal at frequency $w_0$ thereby producing a baseband Q signal 115b. The I signal 115a is applied to low pass filter (LPF) 150a to produce filtered I signal 117a, which is then amplified by amplifier 160a to produce I signal 119a to be input to A/D converter 170a. The Q signal 115b is applied to low pass filter (LPF) 150b to produce filtered Q signal 117b, which is then amplified by amplifier 160b to produce Q signal 119b to be input to A/D converter 170b. Analog-to-digital converters (A/D) 170a and 170b quantize and sample the I signal 119a and the Q signal 119b, respectively, producing the digital signals 123a and 123b. The I signal 123a and the Q signal 123b are over-sampled at a rate that is greater than the symbol rate so that there will be multiple samples for each symbol. In FIG. 2, an over-sampling rate equal to the symbol rate × 48 is shown, meaning there are 48 samples per symbol. Other over-sampling rates are possible in other embodiments.

In FIG. 2, a chain of digital filters 180a, 180b, 190a, 190b, 200a, and 200b reduce the over-sampled rate to the symbol rate by a process of down-sampling and decimation known in the communications art. Filter 1 includes digital filters 180a and 180b and Filter 2 includes digital filters 190a and 190b, while Filter 3 includes digital filters 200a and 200b, as well as decision unit 210. Digital filter 180a reduces the symbol rate of the I signal 123a by a factor of 12 resulting in an I signal 124a at 4×the symbol rate. Digital filter 180b reduces the symbol rate of the Q signal 123b by a factor of 12 resulting in a Q signal 124b at 4×the symbol rate. Digital filter 190a reduces the symbol rate of the I signal 124a by a factor of 2 resulting in an I signal 125a at 2×the symbol rate. Digital filter 190b reduces the symbol rate of the Q signal 124b by a factor of 2 resulting in a Q signal 125b at 2×the symbol rate. Thus, signals 125a and 125b input to Filter 3 are sampled at 2×the symbol rate. In other embodiments, other combinations of one or more digital filters having different reduction values may be employed to reduce the over-sampled symbol rate to the symbol rate.

A decision unit 210, in conjunction with digital filters 200a and 200b, further reduces the symbol rate of the I signal 125a and the Q signal 125b. Digital filter 200a reduces the symbol rate of I signal 125a by a factor of 2 so that I signal 126a is at the symbol rate. Digital filter 200b reduces the symbol rate of Q signal 125b by a factor of 2 so that Q signal 126b is at the symbol rate. In the preferred embodiment, decision unit 210 makes a real time decision after a short delay based on the magnitude of the samples of symbol streams 125a and 125b. The decision unit 210 chooses the largest sample of two samples from input symbol stream 125a to put on output stream 126a, and the largest sample of two samples from input symbol stream 125b to put on output stream 126b. Because both sample points of a symbol will not simultaneously be in a low part of the waveform, the decision unit 210 does not require knowledge of the best sampling point in advance, thus simplifying the receiver design.

The decision unit 210 makes the decision regarding the largest sample by taking into account both I data and Q data. That is, when deciding which sampling point to be put on output stream 126a, the decision unit 210 makes the following amplitude calculation:

$$A(t) = \sqrt{I(t)^2 + Q(t)^2}$$

wherein A represents the amplitude at a given point. The idea is to select the sampling point which maximizes the amplitude, which corresponds to signal strength. Consequently, sampling point decisions are made on combined I and Q data values. It should be noted that the sampling point has to be the same for both the I data stream and the Q data stream.

The chosen signal samples of the in-phase 126a and quadrature phase 126b signals (one sample per symbol) are transmitted to a digital signal processor (DSP) 220 for further processing. The DSP 220 may include one or more of the typical signal processing components shown in the receiving parts of the mobile unit 2 and base station 3 (shown in FIG. 1) such as the Viterbi equalizer, de-ciphering unit, de-interleaver, channel decoder, speech decoder, equalizer and other tasks resulting in recovery of the voice signal. That is, the DSP 220 works in the same way as in the simplified, constant envelope case of GMSK.

The decision unit 210 has low complexity and could be implemented both as hardware or software. No knowledge of the best sampling point is needed in advance. The over-sampling rate in the example is 2 but a higher rate could be considered.

Figure 3:
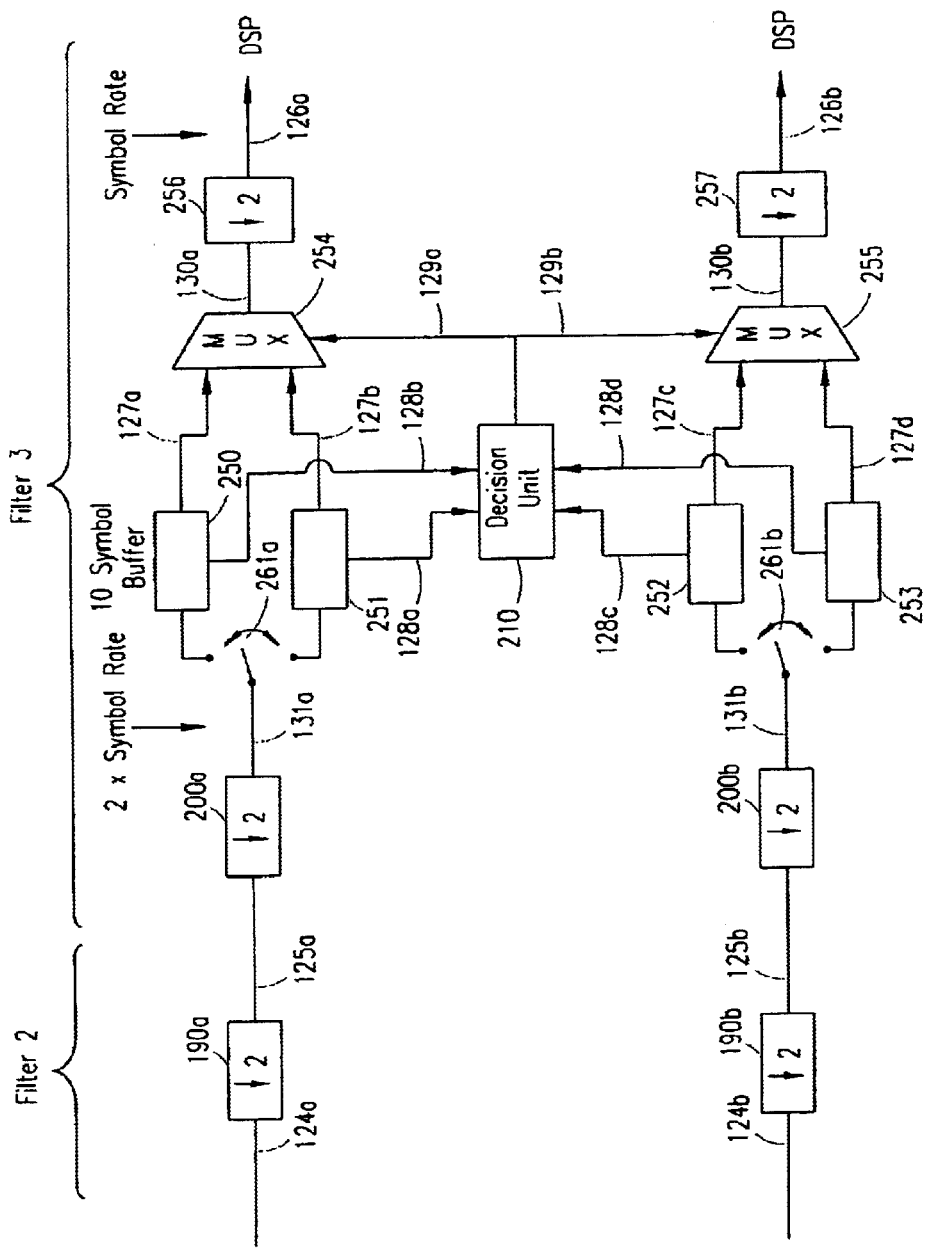
FIG. 3 provides a more detailed view of the demodulator shown in FIG. 2 according to the present invention.

Referring to FIG. 3, the demodulator 100 is shown in greater detail. More specifically, FIG. 3 shows Filter 3 comprising I switch 261a, I buffers 250 and 251, I multiplexer 254, I decimation unit 256, Q switch 261b, Q buffers 252 and 253, Q multiplexer 255, and I decimation unit 257. Each of the I buffers 250 and 251 and the Q buffers 252 and 253 can hold 10 samples. Thus, as will be described in more detail below, in this particular embodiment the decision of the decision unit 210 can be based on 10 samples of a burst. It should be noted, however, that the I buffers 250 and 251 and the Q buffers 252 and 253 may contain any integer number of samples.

Switch 261a couples alternating samples of sample I stream 131a to I buffers 250 and 251. The output of I buffers 250 and 251 are the I streams 127a and 127b, respectively, serving as inputs to I multiplexer 254. Similarly, switch 261b couples alternating samples of Q stream 131b to Q buffers 252 and 253. The output of Q buffers 252 and 253 are the Q streams 127c and 127d, respectively, serving as inputs to Q multiplexer 255. The decision unit 210 has access to the sample values in I buffers 250 and 251 through lines 128a and 128b, and to the sample values in Q buffers 252 and 253 through lines 128c and 128d. Thus, the decision unit 210 again takes into account both I data and Q data, as well as the first 10 samples of a burst, when making a decision regarding the largest sample. That is, the decision unit 210 again makes the above-described amplitude calculation.

The decision unit 210 estimates (for example, by averaging the samples) the most likely sample in I buffers 250 and 251, and then generates signal 129a to the I multiplexer 254 to choose I stream 127a or 127b and to output the chosen sample stream on line 130a. The I decimation unit 256 accepts the sample stream 130a and outputs the symbol estimates onto line 126a at the symbol rate.

Similarly, the decision unit 210 estimates (for example, by averaging the samples) the most likely sample in Q buffers 252 and 253, and then generates signal 129b to the Q multiplexer 255 to choose Q stream 127c or 127d and to output the chosen sample stream on line 130b. The Q decimation unit 257 accepts the sample stream 130b and outputs the symbol estimates onto line 126b at the symbol rate.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. An apparatus for demodulating a data signal previously modulated using linear modulation, comprising:
   a receiver section for receiving the linear modulated data signal and producing an in-phase signal and a quadrature phase signal from the linear modulated data signal;
   a conversion section for transforming by sampling and quantizing the in-phase signal into an in-phase sample stream and the quadrature phase signal into a quadrature sample stream, respectively, the in-phase sample stream and the quadrature sample stream being over-sampled at a rate of N times a symbol rate of the data signal;
   a decimation section for fitering the in-phase sample stream and the quadrature sample stream to produce a reduced in-phase sample stream and a reduced quadrature sample stream at a rate of M times the symbol rate, wherein M is less than or equal to N;
   an in-phase buffer pair for receiving the reduced in-phase sample stream, each in-phase buffer holding L1 samples of the reduced in-phase sample stream;
   a quadrature buffer pair for receiving the reduced quadrature sample stream, each quadrature buffer holding L2 samples of the reduced quadrature sample stream;
   a decision component for calculating, for each in-phase buffer and each quadrature buffer, the magnitude of a combination of the L1 samples of the in-phase buffer and the L2 samples of the quadrature buffer and for selecting an in-phase buffer of the in-phase buffer pair and a quadrature buffer of the quadrature buffer pair, respectively;
   wherein, the selected in-phase buffer and the selected quadrature buffer are associated with the combination of samples having a largest magnitude;
   wherein, responsive to the in-phase buffer selection, an in-phase sample is output; and
   wherein, responsive to the quadrature buffer selection, a quadrature sample is output.

2. The apparatus of claim 1, wherein:
   M=2.

3. The apparatus of claim 2, wherein:
   the decimation section has at least two filters.

4. The apparatus of claim 3, wherein:
   N=48; and
   the decimation section has a first filter and a second filter, the first filter reducing the over-sampling rate N by a factor of 12, the second filter reducing the over-sampling rate N by a factor of 2.

5. The apparatus of claim 1, further comprising:
   a digital signal processor for receiving the in-phase symbol stream and the quadrature symbol stream.

6. The apparatus of claim 5, wherein:
   the digital signal processor recovers the data signal from the in-phase symbol stream and the quadrature symbol stream.

7. The apparatus of claim 5, wherein:
   the digital signal processor performs equalization based upon the in-phase symbol stream and the quadrature symbol stream.

8. The apparatus of claim 1, wherein:
   the linear modulated data signal is a 3/8 8-PSK modulated signal.

9. The apparatus of claim 1, wherein:
   the data signal represents a voice signal.

10. The apparatus of claim 1, further comprising:
    a first multiplexer coupled to outputs of the in-phase buffer pair for selecting one of the in-phase buffer pair and for outputting in-phase samples forming the in-phase symbol stream; and
    a second multiplexer coupled to outputs of the quadrature buffer pair for selecting one of the quadrature buffer pair and for outputting quadrature samples forming the quadrature symbol stream.

11. The apparatus of claim 1, wherein L1=10 and L2=10.

12. The apparatus of claim 1, wherein the magnitude A of a combination of an in-phase sample I and a quadrature sample Q at sample point t is calculated according to the formula:

$$A(t)=SQRT\{I(t)SUP\{2\}+Q(t)SUP\{2\}\}.$$

13. The apparatus of claim 1, wherein the apparatus is part of a mobile unit.

14. The apparatus of claim 1, wherein the apparatus is part of a base station.

15. A method for demodulating a data signal previously modulated using linear modulation, comprising:
    receiving the linear modulated data signal;
    generating an in-phase signal and a quadrature phase signal from the linear modulated data signal;
    converting by sampling and quantizing the in-phase signal into an in-phase sample stream, the in-phase sample stream being over-sampled at a rate of N times a symbol rate of the data signal;
    converting by sampling and quantizing the quadrature phase signal into a quadrature sample stream, the quadrature sample stream being over-sampled at a rate of N times the symbol rate;
    filtering the in-phase sample stream to produce a reduced in-phase sample stream at a rate of M times the symbol rate, wherein M is less than or equal to N;
    filtering the quadrature sample stream to produce a reduced quadrature sample stream at a rate of M times the symbol rate, wherein M is less than or equal to N;
    receiving the reduced in-phase sample stream at an in-phase buffer pair, each in-phase buffer holding L1 samples of the reduced in-phase sample stream;
    receiving the reduced quadrature sample stream at a quadrature buffer pair, each quadrature, buffer holding L2 samples of the reduced quadrature sample stream;
    calculating, for each in-phase buffer and quadrature buffer, the magnitude of a combination of the L1 samples of the in-phase buffer and the L2 samples of the quadrature buffer and selecting an in-phase buffer of the in-phase buffer pair and a quadrature buffer of the quadrature buffer pair, respectively;
    forming an in-phase symbol stream using the L1 in-phase samples associated with the combination of samples having a largest magnitude;
    forming a quadrature symbol stream using the L2 quadrature samples associated with the combination of samples having the largest magnitude;
    outputting the in-phase symbol stream responsive to the in-phase buffer selection; and
    outputting the quadrature symbol stream responsive to the quadrature buffer selection.

16. A mobile communications system, comprising:
    a base station including:
       a transmitter for producing a linear modulated data signal by combining an in-phase signal and a quadrature phase signal; and a mobile unit including:
  a receiver for receiving the linear modulated data signal and recovering the in-phase signal and the quadrature phase signal from the linear modulated data signal;
  a conversion section for transforming by sampling and quantizing the in-phase signal into an in-phase sample stream and the quadrature phase signal into a quadrature sample stream, respectively, the in-phase sample stream and the quadrature sample stream being over-sampled at a rate of N times a symbol rate of the data signal;
  a decimation section for filtering the in-phase sample stream and the quadrature sample stream to produce a reduced in-phase sample stream and a reduced quadrature sample stream at a rate of M times the symbol rate, wherein M is less than or equal to N;
  an in-phase buffer pair for receiving the reduced in-phase sample stream, each in-phase buffer holding L1 samples of the reduced in-phase sample stream;
  a quadrature buffer pair for receiving the reduced quadrature sample stream, each quadrature buffer holding L2 samples of the reduced quadrature sample stream;
  a decision component for calculating, for each in-phase buffer and each quadrature buffer, the magnitude of a combination of a combination the L1 samples of the in-phase buffer and the L2 samples of the quadrature buffer and for selecting an in-phase buffer of the in-phase buffer pair and a quadrature buffer of the quadrature buffer pair, respectively;
  wherein the selected in-phase buffer and the selected quadrature buffer are associated with the combination of samples having a largest magnitude;
  wherein, responsive to the in-phase buffer selection, an in-phase sample is output; and
  wherein, responsive to the quadrature buffer selection, a quadrature sample is output.

17. A mobile communications system, comprising:
a mobile units including:
  a transmitter for producing a linear modulated data signal by combining an in-phase signal and a quadrature phase signal; and a base station including:
  a receiver for receiving the linear modulated data signal and recovering the in-phase signal and the quadrature phase signal from the linear modulated data signal;
  a conversion section for transforming by sampling and quantizing the in-phase signal into an in-phase sample stream and the quadrature phase signal into a quadrature sample stream, respectively, the in-phase sample stream and the quadrature sample stream being over-sampled at a rate of N times a symbol rate of the data signal;
  a decimation section for filtering the in-phase sample stream and the quadrature sample stream to produce a reduced in-phase sample stream and a reduced quadrature sample stream at a rate of M times the symbol rate, wherein M is less than N;
  an in-phase buffer pair for receiving the reduced in-phase sample stream, each in-phase buffer holding L1 samples of the reduced in-phase sample stream;
  a quadrature buffer pair for receiving the reduced quadrature sample stream, each quadrature buffer holding L2 samples of the reduced quadrature sample stream;
  a decision component for calculating, for each in-phase buffer and each quadrature buffer, the magnitude of a combination of the L1 samples of the in-phase buffer and the L2 samples of the quadrature buffer and for selecting an in-phase buffer of the in-phase buffer pair and a quadrature buffer of the quadrature buffer pair, respectively;
  wherein the selected in-phases buffer and the selected quadrature buffer are associated with the combination of samples having a largest magnitude;
  wherein, responsive to the in-phase buffer selection, an in-phase sample is output; and
  wherein, responsive to the quadrature buffer selection, a quadrature sample is output.

* * * * *

UNITED STATES PATENT AND TRADEMARK OFFICE
CERTIFICATE OF CORRECTION

PATENT NO. : 6,904,104 B1
DATED : June 7, 2005
INVENTOR(S) : Anders Khullar et al.

It is certified that error appears in the above-identified patent and that said Letters Patent is hereby corrected as shown below:

Column 2,
Line 20, replace "base-station unit" with -- base station unit --.
Line 43, replace "$W_0$" with -- $w_0$ --.
Line 48, replace "which-makes" with -- which makes --.

Column 7,
Line 14, replace "fitering" with -- filtering --.
Line 33, replace "wherein, the selected" with -- wherein the selected --.
Line 64, replace "3/8 8-PSK" with -- $3\Pi/8$ 8-PSK --.

Column 8,
Line 46, replace "buffer and quadrature" with -- buffer and each quadrature --.

Column 9,
Lines 26-27, replace "of a combination of a combination the" with -- of a combination of the --.

Column 10,
Line 35, replace "in-phases" with -- in-phase --.

Signed and Sealed this

Twenty-seventh Day of September, 2005

JON W. DUDAS
*Director of the United States Patent and Trademark Office*